US011066899B1

(12) United States Patent
Alanqari et al.

(10) Patent No.: US 11,066,899 B1
(45) Date of Patent: Jul. 20, 2021

(54) METHODS OF SEALING A SUBSURFACE FORMATION WITH SAUDI ARABIAN VOLCANIC ASH

(71) Applicant: Saudi Arabian Oil Company, Dhahran (SA)

(72) Inventors: Khawlah A. Alanqari, Al-Khubar (SA); Abdullah Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/822,672

(22) Filed: Mar. 18, 2020

(51) Int. Cl.
*E21B 33/138* (2006.01)
*E21B 43/26* (2006.01)
*C09K 8/467* (2006.01)
*C09K 8/42* (2006.01)

(52) U.S. Cl.
CPC ............ *E21B 33/138* (2013.01); *C09K 8/426* (2013.01); *C09K 8/467* (2013.01); *E21B 43/261* (2013.01)

(58) Field of Classification Search
None
See application file for complete search history.

(56) References Cited

U.S. PATENT DOCUMENTS

| | | | |
|---|---|---|---|
| 394,202 A | 12/1888 | Miller | |
| 745,512 A | 12/1903 | Niedermeyer | |
| 3,499,491 A | 3/1970 | Wyant et al. | |
| 3,557,876 A | 1/1971 | Tragesser | |
| 3,605,898 A | 9/1971 | Harrison et al. | |
| 3,798,191 A | 3/1974 | Donelly | |
| 4,547,298 A | 10/1985 | Novak | |
| 4,760,882 A | 8/1988 | Novak | |
| 4,883,125 A | 11/1989 | Wilson et al. | |
| 4,953,620 A | 9/1990 | Bloys et al. | |
| 5,076,852 A | 12/1991 | Bloys et al. | |
| 5,295,543 A | 3/1994 | Terry et al. | |
| 5,320,171 A | 6/1994 | Laramay | |
| 5,358,044 A | 10/1994 | Hale et al. | |
| 5,361,841 A | 11/1994 | Hale et al. | |
| 5,398,758 A | 3/1995 | Onan et al. | |
| 5,421,409 A | 6/1995 | Mueller et al. | |
| 5,501,277 A | 3/1996 | Onan et al. | |
| 5,911,282 A | 6/1999 | Onan et al. | |
| 5,959,061 A | 9/1999 | Neumann et al. | |
| 6,448,206 B1 | 9/2002 | Griffith et al. | |
| 6,615,918 B2 | 9/2003 | Bayliss et al. | |
| 7,013,973 B2 | 3/2006 | Danican et al. | |
| 7,458,424 B2 | 12/2008 | Odeh et al. | |
| 7,631,632 B2 | 12/2009 | Arov | |
| 7,794,537 B2 | 9/2010 | Barlet-Gouedard et al. | |
| 7,846,250 B2 | 12/2010 | Barlet-Gouedard et al. | |
| 7,926,567 B2 | 4/2011 | Harris et al. | |
| 7,934,557 B2 | 5/2011 | Nguyen | |
| 7,954,549 B2 | 6/2011 | Lende et al. | |
| 8,273,426 B1 | 9/2012 | Laramay et al. | |
| 8,664,285 B2 | 3/2014 | Birnbrich et al. | |
| 8,703,659 B2 | 4/2014 | Dalrymple et al. | |
| 8,887,808 B2 | 11/2014 | Kumar et al. | |
| 9,006,151 B2 | 4/2015 | Amanullah et al. | |
| 9,023,150 B2 | 5/2015 | Brenneis et al. | |
| 9,045,965 B2 | 6/2015 | Patil et al. | |
| 9,133,386 B2 | 9/2015 | Kumar et al. | |
| 9,222,010 B2 | 12/2015 | Porcherie et al. | |
| 9,255,031 B2 | 2/2016 | Pisklak et al. | |
| 9,321,687 B2 | 4/2016 | Gupta et al. | |
| 9,376,901 B2 | 6/2016 | Pantano | |
| 9,410,066 B2 | 8/2016 | Ghassemzadeh | |
| 9,505,972 B2 | 11/2016 | Iverson et al. | |
| 9,695,653 B2 | 7/2017 | Amanullah et al. | |
| 9,840,653 B2 | 12/2017 | Chatterji et al. | |
| 9,863,231 B2 | 1/2018 | Hull et al. | |
| 9,890,082 B2 | 2/2018 | Dubey | |

(Continued)

FOREIGN PATENT DOCUMENTS

| | | |
|---|---|---|
| CN | 1872766 A | 12/2006 |
| CN | 105884306 A | 8/2016 |

(Continued)

OTHER PUBLICATIONS

Leonelli et al., "Volcanic ash as alternative raw materials for traditional vitrified ceramic products," Advances in Applied Ceramics, vol. 106, p. 135-141; 2007. (Year: 2007).*
Celik et al., "High-volume natural volcanic pozzolan and limestone powder as partial replacements for portland cement in self-compacting and sustainable concrete," Cement & Concrete Composites, vol. 45, p. 136-147; Sep. 18, 2013. (Year: 2013).*
Khan et al., "Effect of Fineness of Basaltic Volcanic Ash on Pozzolanic Reactivity, ASR Expansion and Drying Shrinkage of Blended Cement Mortars," Materials, p. 1-21; Aug. 15, 2019. (Year: 2019).*
Office Action dated Oct. 8, 2020 pertaining to U.S. Appl. No. 16/822,651, filed Mar. 18, 2020, 11 pgs.
Notice of Allowance and Fee(s) Due dated Oct. 15, 2020 pertaining to U.S. Appl. No. 16/822,645, filed Mar. 18, 2020, 9 pgs.
Office Action dated Jun. 22, 2020 pertaining to U.S. Appl. No. 16/822,645, filed Mar. 18, 2020, 26 pgs.

(Continued)

*Primary Examiner* — Andrew Sue-Ako
(74) *Attorney, Agent, or Firm* — Dinsmore & Shohl LLP

(57) ABSTRACT

A method of sealing a water-bearing subsurface formation includes introducing an activation solution including an aqueous solution, $Na_2SiO_3$, NaOH, and one or both of $CaCO_3$ or $Mn_3O_4$ into the wellbore. The method further includes introducing Saudi Arabian volcanic ash into the wellbore. The Saudi Arabian volcanic ash comprises $SO_3$, CaO, $SiO_2$, $Al_2O_3$, $Fe_2O_3$, MgO, and $K_2O$. The method further includes allowing the Saudi Arabian volcanic ash to contact the activation solution in the wellbore, thereby forming a geopolymer barrier between the wellbore and the water-bearing subsurface formation and sealing the water-bearing subsurface formation.

19 Claims, No Drawings

(56) References Cited

U.S. PATENT DOCUMENTS

| | | | |
|---|---|---|---|
| 9,932,510 | B2 | 4/2018 | Walker et al. |
| 9,957,434 | B2 | 5/2018 | van Oort et al. |
| 10,005,949 | B2 | 6/2018 | Roddy |
| 10,017,418 | B2 | 7/2018 | Thomas et al. |
| 10,035,945 | B2 | 7/2018 | Scorsone et al. |
| 10,053,612 | B2 | 8/2018 | Agapiou et al. |
| 10,077,636 | B2 | 9/2018 | Marr et al. |
| 10,081,755 | B2 | 9/2018 | Ballard |
| 10,087,107 | B2 | 10/2018 | Allouche et al. |
| 10,087,353 | B2 | 10/2018 | Amanullah |
| 10,100,602 | B2 | 10/2018 | McDonald et al. |
| 10,112,869 | B2 | 10/2018 | Agapiou |
| 10,113,389 | B2 | 10/2018 | Pandey et al. |
| 10,119,060 | B2 | 11/2018 | Pisklak et al. |
| 2004/0108113 | A1 | 6/2004 | Luke et al. |
| 2004/0188091 | A1 | 9/2004 | Luke et al. |
| 2007/0125272 | A1 | 6/2007 | Johnson |
| 2008/0028995 | A1 | 2/2008 | Barlet-Gouedard et al. |
| 2008/0099202 | A1 | 5/2008 | Al-Dhafeeri et al. |
| 2011/0000400 | A1 | 1/2011 | Roddy |
| 2011/0094746 | A1 | 4/2011 | Allison et al. |
| 2012/0260829 | A1 | 10/2012 | Pershikova et al. |
| 2014/0069644 | A1 | 3/2014 | Reddy et al. |
| 2014/0158359 | A1 | 6/2014 | Davidson et al. |
| 2014/0353043 | A1* | 12/2014 | Amanullah ............ C09K 8/508 175/72 |
| 2015/0175481 | A1 | 6/2015 | Pisklak et al. |
| 2016/0046853 | A1 | 2/2016 | Chatterji et al. |
| 2016/0214901 | A1 | 7/2016 | Muthusamy et al. |
| 2016/0264842 | A1 | 9/2016 | Miller et al. |
| 2016/0348451 | A1 | 12/2016 | Amanullah |
| 2017/0001908 | A1 | 1/2017 | Agapiou |
| 2017/0137694 | A1* | 5/2017 | van Oort .................. C09K 8/42 |
| 2017/0183556 | A1 | 6/2017 | Agapiou et al. |
| 2017/0260819 | A1 | 9/2017 | Amanullah et al. |
| 2017/0298263 | A1 | 10/2017 | Amanullah |
| 2017/0334779 | A1* | 11/2017 | Gong ...................... C04B 14/22 |
| 2019/0152853 | A1 | 5/2019 | Turcinskas et al. |
| 2020/0002594 | A1 | 1/2020 | Ray et al. |
| 2020/0131427 | A1 | 4/2020 | Alsaihati et al. |

FOREIGN PATENT DOCUMENTS

| | | |
|---|---|---|
| CN | 105980514 A | 9/2016 |
| GB | 1113205 A | 5/1968 |
| GB | 2353523 A | 2/2001 |
| JP | 2004067419 A | 3/2004 |
| WO | 2012061187 A2 | 5/2012 |
| WO | 2016043712 A1 | 3/2016 |
| WO | 2016043979 A1 | 3/2016 |
| WO | 2016122530 A1 | 8/2016 |
| WO | 2017174560 A1 | 10/2017 |
| WO | 2020046734 A1 | 3/2020 |

OTHER PUBLICATIONS

Office Action dated Jun. 23, 2020 pertaining to U.S. Appl. No. 16/822,651, filed Mar. 18, 2020, 29 pgs.

Ahdaya et al., "Investigating geopolymer cement performance in presence of water based drill fluid", Journal of Petroleum of Science and Engineering, vol. 176, pp. 934-942, Feb. 7, 2019.

Alp et al, "Utilization of Supplementary Cementitious Materials in Geothermal Well Cementing", Proceedings, Thirty-Eighth Workshop on Geothermal Reservoir Engineering, Stanford University, Stanford, California, Feb. 11-13, Feb. 11, 2013.

Al-Yami et al., "Chemical Additives for Oil Well Cementing", Research & Reviews: Journal of Chemistry, vol. 6, Issue 4, Oct. 20, 2017.

Hurley et al., Sodium Silicate Stabilization of Soils: A review of the literature, Chemical Stabilization on Foundations, pp. 46-79, 1972.

Liu et al., "Solidification of Synthetic-Based Drilling Mud Using Geopolymers", Society of Petroleum Engineers, SPE-180325-MS, Sep. 14, 2016.

Liu et al., "Geopolymer—Synthetic Based Mud Hybrid Cements for Primary Cementing and Lost Circulation Control", SPE-184558-MS, Apr. 3, 2017.

Petermann et al., Alkali-Activated Geopolymers: A Literature Review, Applied Research Associates, Inc. and Airbase Technologies Division, Air Force Research Laboratory, Feb. 6, 2012.

Piklowska et al., "Cement slurries used in drilling—types, properties, application", World Scientific News, vol. 76 pp. 149-165 Jun. 9, 2017.

Sugama, "Advanced Cements for Geothermal Wells", Brookhaven National Laboratory, Sustainable Energy Technologies Department, BNL-77901-2007-IR, Jul. 2006.

US Dept of Energy, "Learning from Roman Seater Concrete", Advanced Light Source Communications Group, 2016.

Notice of Allowance and Fee(s) Due dated Jan. 22, 2021 pertaining to U.S. Appl. No. 16/822,651, filed Mar. 18, 2020, 5 pgs.

International Search Report and Written Opinion dated Dec. 10, 2020 pertaining to International application No. PCT/US2020/050663 filed Sep. 14, 2020, 15 pgs.

Office Action dated Dec. 30, 2020 pertaining to U.S Appl. No. 16/822,690, filed Mar. 18, 2020, 37 pgs.

International Search Report and Written Opinion dated Jan. 2, 2021 pertaining to International application No. PCT/US2020/052694 filed Sep. 25, 2020, 17 pgs.

Haddad, R. et al. "Production of geopolymer concrete using natural pozzolan: A parametric study" Construction and Building Materials, vol. 114, Apr. 6, 2016, pp. 699-707.

Tchakoute H.K. et al. "Utilization of volcanic ashes for the production of geopolymers cured at ambient temperature" Cement and Concrete Composites, vol. 38, Apr. 1, 2013, pp. 75-81.

Risdanareni P. et al. "The Influence of Alkali Activator Concentration to Mechanical Properties of Geopolymer Concrete with Trass as a Filler" Materials Science Forum, vol. 803, Aug. 1, 2014, pp. 125-134.

Djobo et al. "Volcanic ash-based geopolymer cements/concretes: the current state of the art and perspectives" Environmental Science and Pollution Research International, Ecomed, Landsberg, DE, vol. 24, No. 5, Dec. 15, 2016, pp. 4433-4446.

Cai G. et al. "Volcano-related materials in concretes: a comprehensive review" Environmental Science and Pollution Research International, Ecomed, Landsberg, DE, vol. 23, No. 8, Feb. 11, 2016, pp. 1220-7243.

Lemougna P. et al. "Review on the use of volcanic ashes for engineering applications" Resources, Conservation and Recycling, Elsevier, Amsterdam, NL, vol. 137, Jun. 19, 2018, pp. 177-190.

International Search Report and Written Opinion dated Jan. 27, 2021 pertaining to International application No. PCT/US2020/056820 filed Oct. 22, 2020, 17 pgs.

International Search Report and Written Opinion dated Jan. 19, 2021 pertaining to International application No. PCT/US2020/054200 filed Oct. 5, 2020, 16 pgs.

International Search Report and Written Opinion dated Jan. 25, 2021 pertaining to International application No. PCT/US2020/057346 filed Oct. 26, 2020, 16 pgs.

International Search Report and Written Opinion dated Jan. 25, 2021 pertaining to International application No. PCT/US2020/056825 filed Oct. 22, 2020, 16 pgs.

* cited by examiner

METHODS OF SEALING A SUBSURFACE FORMATION WITH SAUDI ARABIAN VOLCANIC ASH

TECHNICAL FIELD

The present disclosure relates to natural resource well drilling and hydrocarbon production and, more specifically, to methods and compositions for plugging and sealing subsurface formations.

BACKGROUND

Excessive water production greatly affects the economic life of producing wells. High water cut, such as a water cut of greater than 50%, largely affects the economic life of producing wells and is also responsible for many oilfield-related damage mechanisms, such as scale deposition, fines migration, asphaltene precipitation, and corrosion. In such water production instances, methods and compositions for plugging and sealing subsurface zones that lead to high water cut in wells can be utilized to decrease the water cut.

SUMMARY

It is often desirable to seal a subsurface formation to decrease water production from that subsurface formation. Sealing the water-producing formation prevents contaminating hydrocarbon production from a producing formation with water from a water-producing formation. The water-producing formation may be either above or below the oil-producing formation. A high water cut leads to increased operating costs to separate, treat, and dispose of the produced water according to environmental regulations. Though there are a variety of chemicals used by the industry to control water production, most of them are not accepted in the regions with strict environmental regulations.

The present disclosure provides compositions for plugging and sealing water producing subsurface formations. Conventional sealing methods utilize silica to gel and seal the formation by pumping silica and an acid compound into the subsurface formation. However, pumping acid downhole may harm the subsurface formation by acidizing carbonate formations. Additionally, acid may be spent acidizing the carbonate formation, and not contacting the silica, therefore not effectively gelling the silica and not effectively sealing the subsurface formation. Finally, conventional sealing methods may be inadvertently positioned in undesirable locations, such as the incorrect subsurface formation or the producing formation, thereby not effectively combating high water cut, and possibly inhibiting hydrocarbon production.

Accordingly, an improved sealing method that will not acidize carbonate formations and is removable is warranted. The present embodiments address these needs by providing methods of forming geopolymer barriers between a wellbore and a water-bearing formation that include Saudi Arabian volcanic ash. In addition, the geopolymer barrier is acid soluble, so the geopolymer barrier may be removed after placement by introducing acid to the subsurface formation where the geopolymer barrier is located.

In one embodiment, a method of sealing a water-bearing subsurface formation is provided. The method includes introducing an activation solution comprising an aqueous solution, $Na_2SiO_3$, NaOH, and one or both of $CaCO_3$ or $Mn_3O_4$ into the wellbore and introducing Saudi Arabian volcanic ash into the wellbore. The Saudi Arabian volcanic ash comprises $SO_3$, CaO, $SiO_2$, $Al_2O_3$, $Fe_2O_3$, MgO, and $K_2O$. The method further includes allowing the Saudi Arabian volcanic ash to contact the activation solution in the wellbore, thereby forming a geopolymer barrier between the wellbore and the water-bearing subsurface formation and sealing the water-bearing subsurface formation.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "geopolymer barrier" refers to a composition comprising Saudi Arabian volcanic ash that is mixed with at least water to form cement. The geopolymer barrier may contain calcined alumina ($Al_2O_3$), silica ($SiO_2$), calcium oxide (CaO, also known as lime), iron oxide ($Fe_2O_3$), magnesium oxide (MgO), clay, sand, gravel, and mixtures thereof.

As used throughout this disclosure, the term "consistency" refers to a rheological property of matter related to the cohesion of the individual particles of a given material, its ability to deform and its resistance to flow. The consistency of the geopolymer barrier is determined by thickening time tests in accordance with API Recommended Practice 10B and is expressed in Bearden units of consistency (Bc), a dimensionless quantity with no direct conversion factor to more common units of viscosity. The Bearden units of consistency is measured on a scale from 1 to 100 where, conventionally, difficult pumping is thought to begin at 50 Bc, and cement is completely set at 100 Bc.

As used throughout this disclosure, the term "curing" refers to providing adequate moisture, temperature and time to allow the concrete to achieve the desired properties (such as hardness) for its intended use through one or more reactions between the water and the Saudi Arabian volcanic ash.

As used throughout this disclosure, the term "drying" refers to merely allowing the cement to achieve a moisture condition appropriate for its intended use, which may only involve physical state changes, as opposed to chemical reactions.

As used throughout this disclosure, the term "free of" as used to describe any chemical or component refers to not including more than trace amounts of the chemical or component, where trace amounts refers to having less than 0.1% of the chemical or component.

As used throughout this disclosure, the term "plastic viscosity" refers to the slope of the shear stress/shear rate line greater than the yield point. Plastic viscosity represents the viscosity of a fluid when extrapolated to infinite shear rate. Plastic viscosity is increased by a viscous base fluid and by excess colloidal solids.

As used throughout this disclosure, the term "point of departure" refers to the beginning of thickening of a geopolymer barrier during the thickening-time test, and is often abbreviated as POD. For some geopolymer barriers, the POD is used as the thickening time.

As used throughout this disclosure, the term "producing formation" refers to the formation from which hydrocarbons are produced.

As used throughout this disclosure, the term "retarder" refers to a chemical agent used to increase the thickening time of geopolymer barrier to enable proper placement. The need for cement retardation increases with depth due to the greater time required to complete the cementing operation and the effect of increased temperature on the cement-setting process.

As used throughout this disclosure, the term "Saudi Arabian volcanic ash" refers to volcanic ash originally acquired from Saudi Arabia.

As used throughout this disclosure, the term "shear stress" refers to the force per unit area required to sustain a constant rate of fluid movement.

As used throughout this disclosure, the term "shear rate" refers to the rate of change of velocity at which one layer of fluid passes over an adjacent layer.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a geopolymer barrier remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bc.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout this disclosure, the term "water cut" refers to the ratio of water produced compared to the volume of total liquids produced.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout this disclosure, the term "yield point" refers to the point in the stress-strain curve at which the curve levels off and plastic deformation begins to occur. Yield point is used to evaluate the void filling properties of cements and the ability of a cement to flow through the annulus. A greater yield point implies a non-Newtonian fluid, one that flows more uniformly than a fluid of similar density but lesser yield point. Yield point is increased by adding freshly dispersed clay or a flocculant, such as lime.

Embodiments of the present disclosure relate to methods of sealing subsurface formations. To produce hydrocarbons from a hydrocarbon-containing formation, production wells are drilled to a depth that enables hydrocarbons to travel from the subsurface formation to the surface. However, some formations in contact with the wellbore may include water, which may lead to water production from the well. High water production, or water cut, is generally undesirable, and sealing the water-bearing formation will decrease the water cut and increase the amount of hydrocarbons produced over the lifetime of the well.

This application discloses a method of sealing water-bearing subsurface formations by forming a geopolymer barrier between the wellbore and the subsurface formation. To ensure the stability and safety of a well, it is important that the geopolymer barrier maintains integrity and isolates the wellbore from the surrounding subsurface formations. If the geopolymer barrier cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid or hydrocarbon fluid loss from the wellbore into the surrounding subsurface formation, or in decreased wellbore pressure, possibly leading to a well control event. Therefore, wellbore integrity and isolation are critical to efficient production and use of a wellbore.

The method of sealing water-bearing subsurface formations may include initially producing hydrocarbons from a reservoir. The hydrocarbon production may have a first water cut. The first water cut may be from 30% to 90%, from 30% to 80%, from 30% to 70%, from 30% to 60%, from 30% to 50%, from 30% to 40%, from 40% to 90%, from 40% to 80%, from 40% to 70%, from 40% to 60%, from 40% to 50%, from 50% to 90%, from 50% to 80%, from 50% to 70%, from 50% to 60%, from 60% to 90%, from 60% to 80%, from 60% to 70%, from 70% to 90%, from 70% to 80%, or from 80% to 90%. The method may include producing hydrocarbons from the reservoir before introducing an activation solution and Saudi Arabian volcanic ash into the wellbore to seal the water-bearing subsurface formation.

The method may further include shutting in the wellbore or otherwise halting or stopping hydrocarbon production from the reservoir. In embodiments, hydrocarbon production may be stopped before introducing the activation solution and the Saudi Arabian volcanic ash. In embodiments, the method may include placing a packer above the producing formation. In embodiments, the method may include placing a packer below the producing formation. In embodiments, the method may include placing a cement plug below the producing formation. In embodiments, the cement plug may be acid soluble, such that production may be restored by introducing an acid solution into the wellbore to dissolve the cement plug. The packer or cement plug may temporarily stop hydrocarbon production, water production, or both, during introduction of the activation solution and Saudi Arabian volcanic ash.

The method includes introducing the activation solution into the wellbore. The method may include introducing the activation solution after initially producing hydrocarbons from the reservoir. Similarly, the method may include introducing the activation solution after stopping hydrocarbon production from the reservoir. The activation solution includes an aqueous solution, sodium silicate ($Na_2SiO_3$), and sodium hydroxide (NaOH). The aqueous phase may include at least one of fresh water, salt water, brine, municipal water, formation water, produced water, well water, filtered water, distilled water, sea water, or combinations thereof. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the activation solution. Increasing the saturation of the aqueous phase by increasing the salt concentration or the level of other organic compounds in the aqueous phase may increase the density of the activation solution. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the activation solution and the subterranean formation.

In some embodiments, the activation solution may contain from 10 weight percent (wt. %) to 70 wt. % of the aqueous phase based on the total weight of the activation solution. In some embodiments, the activation solution may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

The activation solution further includes $Na_2SiO_3$, and NaOH. In embodiments, the activation solution may include from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % $Na_2SiO_3$ based on the total weight of the activation solution. In embodiments, $Na_2SiO_3$ may be used as a shale stabilizer.

The $Na_2SiO_3$ may have a ratio of $Na_2O$ to $SiO_2$ of from 0.250:1 to 0.350:1, from 0.250:1 to 0.330:1, from 0.250:1 to 0.300:1, from 0.250:1 to 0.270:1, from 0.270:1 to 0.350:1, from 0.270:1 to 0.330:1, from 0.270:1 to 0.300:1, from 0.300:1 to 0.350:1, from 0.300:1 to 0.330:1, or from 0.330:1 to 0.350:1.

In embodiments, the activation solution may include from 15 to 35 wt. %, from 15 to 30 wt. %, from 15 to 25 wt. %, from 15 to 20 wt. %, from 20 to 35 wt. %, from 20 to 30 wt. %, from 20 to 25 wt. %, from 25 to 35 wt. %, from 25 to 30 wt. %, or from 30 to 35 wt. % NaOH based on the total weight of the activation solution. In embodiments, NaOH may be used as a pH control additive such that the activation solution has a pH of from 7 to 14, from 7 to 12, from 7 to 11, from 7 to 10, from 7 to 9, from 8 to 14, from 8 to 12, from 8 to 11, from 8 to 10, from 8 to 9, from 9 to 14, from 9 to 12, from 9 to 11, from 9 to 10, from 10 to 14, from 10 to 12, from 10 to 11, from 11 to 14, from 11 to 13, from 11 to 12, from 11.6 to 14, from 11.6 to 13, from 12 to 13, greater than 8, greater than 9, greater than 10, greater than 10.5, greater than 11, or greater than 11.6 when NaOH is present. Without intending to be bound by theory, NaOH may be used as a pH control additive to prevent corrosion in the wellbore. It is contemplated that the alkaline environment (when the pH is as described previously) may dissolve the alumina and silica, and allow for silicon and aluminum tetrahedral to form, thereby forming the geopolymer barrier by sharing oxygen atoms. A pH as described previously may accelerate the dissolution of the alumina and silica, thereby accelerating the formation of the geopolymer barrier.

The activation solution further includes one or both of $CaCO_3$ or $Mn_3O_4$. The activation solution comprises from 10 to 90 wt. %, from 10 to 85 wt. %, from 10 to 80 wt. %, from 10 to 75 wt. %, from 10 to 70 wt. %, from 10 to 65 wt. %, from 10 to 60 wt. %, from 10 to 55 wt. %, from 10 to 50 wt. %, from 10 to 45 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 90 wt. %, from 15 to 85 wt. %, from 15 to 80 wt. %, from 15 to 75 wt. %, from 15 to 70 wt. %, from 15 to 65 wt. %, from 15 to 60 wt. %, from 15 to 55 wt. %, from 15 to 50 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 90 wt. %, from 20 to 85 wt. %, from 20 to 80 wt. %, from 20 to 75 wt. %, from 20 to 70 wt. %, from 20 to 65 wt. %, from 20 to 60 wt. %, from 20 to 55 wt. %, from 20 to 50 wt. %, from 20 to 45 wt. %, from 20 to 40 wt. %, from 20 to 35 wt. %, from 20 to 30 wt. %, from 20 to 25 wt. %, from 25 to 90 wt. %, from 25 to 85 wt. %, from 25 to 80 wt. %, from 25 to 75 wt. %, from 25 to 70 wt. %, from 25 to 65 wt. %, from 25 to 60 wt. %, from 25 to 55 wt. %, from 25 to 50 wt. %, from 25 to 45 wt. %, from 25 to 40 wt. %, from 25 to 35 wt. %, from 25 to 30 wt. %, from 30 to 90 wt. %, from 30 to 85 wt. %, from 30 to 80 wt. %, from 30 to 75 wt. %, from 30 to 70 wt. %, from 30 to 65 wt. %, from 30 to 60 wt. %, from 30 to 55 wt. %, from 30 to 50 wt. %, from 30 to 45 wt. %, from 30 to 40 wt. %, from 30 to 35 wt. %, from 35 to 90 wt. %, from 35 to 85 wt. %, from 35 to 80 wt. %, from 35 to 75 wt. %, from 35 to 70 wt. %, from 35 to 65 wt. %, from 35 to 60 wt. %, from 35 to 55 wt. %, from 35 to 50 wt. %, from 35 to 45 wt. %, from 35 to 40 wt. %, from 40 to 90 wt. %, from 40 to 85 wt. %, from 40 to 80 wt. %, from 40 to 75 wt. %, from 40 to 70 wt. %, from 40 to 65 wt. %, from 40 to 60 wt. %, from 40 to 55 wt. %, from 40 to 50 wt. %, from 40 to 45 wt. %, from 45 to 90 wt. %, from 45 to 85 wt. %, from 45 to 80 wt. %, from 45 to 75 wt. %, from 45 to 70 wt. %, from 45 to 65 wt. %, from 45 to 60 wt. %, from 45 to 55 wt. %, from 45 to 50 wt. %, from 50 to 90 wt. %, from 50 to 85 wt. %, from 50 to 80 wt. %, from 50 to 75 wt. %, from 50 to 70 wt. %, from 50 to 65 wt. %, from 50 to 60 wt. %, from 50 to 55 wt. %, from 55 to 90 wt. %, from 55 to 85 wt. %, from 55 to 80 wt. %, from 55 to 75 wt. %, from 55 to 70 wt. %, from 55 to 65 wt. %, from 55 to 60 wt. %, from 60 to 90 wt. %, from 60 to 85 wt. %, from 60 to 80 wt. %, from 60 to 75 wt. %, from 60 to 70 wt. %, from 60 to 65 wt. %, from 65 to 90 wt. %, from 65 to 85 wt. %, from 65 to 80 wt. %, from 65 to 75 wt. %, from 65 to 70 wt. %, from 70 to 90 wt. %, from 70 to 85 wt. %, from 70 to 80 wt. %, from 75 to 90 wt. %, from 75 to 85 wt. %, from 75 to 80 wt. %, from 80 to 90 wt. %, from 80 to 85 wt. %, or from 85 to 90 wt. % $CaCO_3$ or $Mn_3O_4$ by weight of activation solution.

In some embodiments, the activation solution may contain at least one additive other than $Na_2SiO_3$, NaOH, $CaCO_3$, or $Mn_3O_4$. The one or more additives may be any additives known to be suitable for activation solutions. As non-limiting examples, suitable additives may include fluid loss control agents, lost circulation control agents, filtration control additives, antifoaming agents, emulsifiers, weighting agent, fluid loss additives, an alkali reserve, specialty additives, and combinations of these.

In some embodiments, the one or more additives may include an additional viscosifier, also referred to as a rheology modifier, which may be added to the activation solution to impart non-Newtonian fluid rheology to the activation solution to facilitate lifting and conveying rock cuttings to the surface of the wellbore. The viscosifier may include bentonite, polyacrylamide, polyanionic cellulose, or combinations of these. In some embodiments, the activation solution may include xanthan gum, a polysaccharide commonly referred to XC polymer. The XC polymer may be added to the water-based activation solution to produce a flat velocity profile of the water-based activation solution in annular flow, which may help to improve the efficiency of the activation solution in lifting and conveying rock cuttings to the surface.

In some embodiments, the activation solution may contain from 0.01 wt. % to 20 wt. % of the one or more additives based on the total weight of the activation solution. The activation solution may contain from 0.02 lb/bbl to 180 lb/bbl of the one or more additives based on the total weight of the activation solution, such as from 0.02 to 150 lb/bbl, or from 0.05 to 150 lb/bbl. In some embodiments, the activation solution may contain from 0.1 to 150 lb/bbl, or from 0.1 to 100 lb/bbl, or from 1 to 100 lb/bbl of the one or more additives.

The activation solution may include at least one weighting agent. In embodiments, the activation solution may be a drilling fluid. The weighting agent may be chosen from the group consisting of manganese oxide ($Mn_3O_4$), ferrosilicon, hausmannite, lime (CaO), calcium carbonate ($CaCO_3$), bentonite, montmorillonite clay, siderite ($FeCO_3$), ilmenite ($FeO.TiO_3$), barium sulfate (barite, ($BaSO_4$)), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, and combinations thereof.

In some embodiments, the activation solution may contain from 0.01 wt. % to 20 wt. % of the at least one weighting agent based on the total weight of the activation solution. The activation solution may contain from 0.02 pounds per barrel (lb/bbl) to 180 lb/bbl of the one or more additives based on the total weight of the activation solution, such as from 0.02 to 150 lb/bbl, or from 0.05 to 150 lb/bbl. In some embodiments, the activation solution may contain from 0.1 to 150 lb/bbl, or from 0.1 to 100 lb/bbl, or from 1 to 100 lb/bbl of the one or more additives.

In some embodiments, the at least one weighting agent may include solids, which may be dispersed in the activation solution. The solids may be finely divided solids that may be added to the activation solution to increase the density of the activation solution. The solids may have a specific gravity of from 1 to 10 grams per centimeter cubed ($g/cm^3$), from 2 to 10 $g/cm^3$, from 3 to 10 $g/cm^3$, from 4 to 10 $g/cm^3$, from 4.5 to 10 $g/cm^3$, from 5 to 10 $g/cm^3$, from 6 to 10 $g/cm^3$, from 8 to 10 $g/cm^3$, from 1 to 8 $g/cm^3$, from 2 to 8 $g/cm^3$, from 3 to 8 $g/cm^3$, from 4 to 8 $g/cm^3$, from 4.5 to 8 $g/cm^3$, from 5 to 8 $g/cm^3$, from 6 to 8 $g/cm^3$, from 1 to 6 $g/cm^3$, from 2 to 6 $g/cm^3$, from 3 to 6 $g/cm^3$, from 4 to 6 $g/cm^3$, from 4.5 to 6 $g/cm^3$, from 5 to 6 $g/cm^3$, from 1 to 5 $g/cm^3$, from 2 to 5 $g/cm^3$, from 3 to 5 $g/cm^3$, from 4 to 5 $g/cm^3$, from 4.5 to 5 $g/cm^3$, from 1 to 4.5 $g/cm^3$, from 2 to 4.5 $g/cm^3$, from 3 to 4.5 $g/cm^3$, from 4 to 4.5 $g/cm^3$, from 1 to 4 $g/cm^3$, from 2 to 4 $g/cm^3$, from 3 to 4 $g/cm^3$, from 1 to 3 $g/cm^3$, or from 2 to 3 $g/cm^3$.

In embodiments, the activation solution may have a solids content of from 1 wt. % to 80 wt. % based on the weight of the solid weighing material based on the total weight of the activation solution. The activation solution may have a solids content of from 2.5 lb/bbl to 720 lb/bbl, such as from 2.5 to 720 lb/bbl, or 2.5 to 700 lb/bbl. In some embodiments, the activation solution may have a solids content of from 5 to 700 lb/bbl, from 50 to 500 lb/bbl, or from 100 to 600 lb/bbl.

As stated, the addition of solids may be used to control the density of the activation solution. In some embodiments, the activation solution may have a density of from 50 pounds of mass per cubic foot (pcf) to 160 pcf, as measured using a mud balance in accordance with the American Petroleum Institute (API) recommended practice 13B-2. The activation solution may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the activation solution may have a density of from 50 pcf to 75 pcf, or from 75 pcf to 100 pcf, or from 120 pcf to 160 pcf. In some embodiments, mud weights less than 100 pcf may be used when drilling depleted formations.

The method further includes introducing Saudi Arabian volcanic ash into the wellbore. The Saudi Arabian volcanic ash may have a particle size of from 20 to 30 microns. The Saudi Arabian volcanic ash is free of $TiO_2$. The Saudi Arabian volcanic ash may comprise from 0.05 to 2 wt. %, from 0.05 to 1 wt. %, from 0.05 to 0.8 wt. %, from 0.05 to 0.5 wt. %, from 0.05 to 0.2 wt. %, from 0.05 to 0.15 wt. %, from 0.05 to 0.1 wt. %, from 0.1 to 2 wt. %, from 0.1 to 1 wt. %, from 0.1 to 0.8 wt. %, from 0.1 to 0.5 wt. %, from 0.1 to 0.2 wt. %, from 0.1 to 0.15 wt. %, from 0.15 to 2 wt. %, from 0.15 to 1 wt. %, from 0.15 to 0.8 wt. %, from 0.15 to 0.5 wt. %, from 0.15 to 0.2 wt. %, from 0.2 to 2 wt. %, from 0.2 to 1 wt. %, from 0.2 to 0.8 wt. %, or from 0.2 to 0.5 wt. % $SO_3$. More specifically, the Saudi Arabian volcanic ash may comprise from 0.05 to 0.2 wt. % $SO_3$, from 5 to 10 wt. % CaO, from 40 to 50 wt. % $SiO_2$, from 10 to 20 wt. % $Al_2O_3$, from 10 to 15 wt. % $Fe_2O_3$, from 5 to 10 wt. % MgO, and from 0.5 to 5 wt. % $K_2O$. The geopolymer barrier may include from 2 to 80 wt. % BWOV, from 5 to 80 wt. % BWOV, from 8 to 80 wt. % BWOV, from 15 to 80 wt. % BWOV, from 25 to 80 wt. % BWOV, from 40 to 80 wt. % BWOV, from 50 to 80 wt. % BWOV, from 60 to 80 wt. % BWOV, from 2 to 60 wt. % BWOV, from 5 to 60 wt. % BWOV, from 8 to 60 wt. % BWOV, from 15 to 60 wt. % BWOV, from 25 to 60 wt. % BWOV, from 40 to 60 wt. % BWOV, from 50 to 60 wt. % BWOV, from 2 to 50 wt. % BWOV, from 5 to 50 wt. % BWOV, from 8 to 50 wt. % BWOV, from 15 to 50 wt. % BWOV, from 25 to 50 wt. % BWOV, from 40 to 50 wt. % BWOV, from 2 to 40 wt. % BWOV, from 5 to 40 wt. % BWOV, from 8 to 40 wt. % BWOV, from 15 to 40 wt. % BWOV, from 25 to 40 wt. % BWOV, from 2 to 25 wt. % BWOV, from 5 to 25 wt. % BWOV, from 8 to 25 wt. % BWOV, from 15 to 25 wt. % BWOV, from 2 to 15 wt. % BWOV, from 5 to 15 wt. % BWOV, from 8 to 15 wt. % BWOV, from 2 to 8 wt. % BWOV, or from 5 to 8 wt. % BWOV Saudi Arabian volcanic ash.

The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % CaO. The Saudi Arabian volcanic ash may comprise from 30 to 70 wt. %, from 30 to 60 wt. %, from 30 to 55 wt. %, from 30 to 50 wt. %, from 30 to 45 wt. %, from 30 to 40 wt. %, from 35 to 70 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, or from 50 to 55 wt. % $SiO_2$. The Saudi Arabian volcanic ash may comprise from 2 to 40 wt. %, from 2 to 35 wt. %, from 2 to 30 wt. %, from 2 to 25 wt. %, from 2 to 20 wt. %, from 2 to 15 wt. %, from 2 to 10 wt. %, from 2 to 5 wt. %, from 5 to 40 wt. %, from 5 to 35 wt. %, from 5 to 30 wt. %, from 5 to 25 wt. %, from 5 to 20 wt. %, from 5 to 15 wt. %, from 5 to 10 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. % $Al_2O_3$. The Saudi Arabian volcanic ash may comprise from 2 to 30 wt. %, from 2 to 25 wt. %, from 2 to 20 wt. %, from 2 to 15 wt. %, from 2 to 13 wt. %, from 2 to 10 wt. %, from 2 to 8 wt. %, from 2 to 5 wt. %, from 5 to 30 wt. %, from 5 to 25 wt. %, from 5 to 20 wt. %, from 5 to 15 wt. %, from 5 to 13 wt. %, from 5 to 10 wt. %, from 5 to 8 wt. %, from 8 to 30 wt. %, from 8 to 25 wt. %, from 8 to 20 wt. %, from 8 to 15 wt. %, from 8 to 13 wt. %, from 8 to 10 wt. %, from 10 to 30 wt. %, from 10 to 25 wt. %, from 10 to 20 wt. %, from 10 to 15 wt. %, from 10 to 13 wt. %, from 13 to 30 wt. %, from 13 to 25 wt. %, from 13 to 20 wt. %, from 13 to 15 wt. %, from 15 to 30 wt. %, from 15 to 25 wt. %, or from 15 to 20 wt. % $Fe_2O_3$. The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % MgO. The Saudi Arabian volcanic ash may comprise from 0.2 to 10 wt. %, from 0.2 to 7 wt. %, from 0.2 to 5 wt. %, from 0.2 to 3 wt. %, from 0.2 to 2 wt. %, from 0.2 to 1 wt. %, from 0.2 to 0.5 wt. %, from 0.5 to 10 wt. %, from 0.5 to 7 wt. %, from 0.5 to 5 wt. %, from 0.5 to 3 wt. %, from 0.5 to 2 wt. %, from 0.5 to 1 wt. %, from 1 to 10 wt. %, from 1 to 7 wt. %, from 1 to 5 wt. %, from 1 to 3 wt. %, from 1 to 2 wt. %, from 2 to 10 wt. %, from 2 to 7 wt. %, from 2 to 5 wt. %, from 1 to 3 wt. %, from 3 to 10 wt. %, from 3 to 7 wt. %, from 3 to 5 wt. %, from 5 to 10 wt. %, or from 5 to 7 wt. % $K_2O$.

In embodiments, introducing Saudi Arabian volcanic ash into the wellbore includes introducing an ash solution including an aqueous solution and Saudi Arabian volcanic ash. The method of making the ash solution of the present disclosure includes mixing Saudi Arabian volcanic ash and an aqueous solution to form the ash solution, in which the Saudi Arabian volcanic ash comprises $SO_3$, CaO, $SiO_2$, $Al_2O_3$, $Fe_2O_3$, MgO, and $K_2O$.

Without being bound by any particular theory, use of Saudi Arabian volcanic ash may provide the geopolymer barrier with improved mechanical properties and increased resistance to $H_2S$ of the geopolymer barrier.

The mixing step, in some embodiments, may involve shearing the aqueous solution, and Saudi Arabian volcanic ash and, optionally, other additives at a suitable speed for a suitable period of time to form the ash solution. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \quad \text{(Equation 1)}$$

Where
E=Mixing energy (kiloJoules (kJ))
M=Mass of slurry (kilograms (kg))
k=$6.1 \times 10^{-8}$ $m^5/s$ (constant found experimentally)
$\omega$=Rotational speed (radians/second ($s^{-1}$))
t=Mixing time (s)
V=Slurry volume ($m^3$)

An aqueous solution may be added to the Saudi Arabian volcanic ash to produce the ash solution. The aqueous solution may include one or more than one of deionized water, tap water, fresh water, salt water, natural or synthetic brine, municipal water, formation water, produced water, well water, filtered water, distilled water, sea water, other types of water, or combinations of waters. In some embodiments, the aqueous solution may include water or a solution containing water and one or more inorganic compounds dissolved in the water or otherwise completely miscible with the water. In some embodiments, the aqueous solution may contain brine, including natural and synthetic brine. In some embodiments, salt or other organic compounds may be incorporated into the aqueous solution to control certain properties of the ash solution, and thus the geopolymer barrier, such as density. Without being bound by any particular theory, increasing the saturation of the aqueous solution by increasing the salt concentration or the level of other organic compounds in the water may increase the density of the ash solution, and thus, the geopolymer barrier. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the ash solution may contain from 10 to 70 weight percent (wt. %) by weight of volcanic ash (BWOV) aqueous solution. In some embodiments, the ash solution may contain from 10 to 40 wt. %, from 10 to 30 wt. %, from 10 to 20 wt. %, from 20 to 40 wt. %, from 25 to 35 wt. %, or from 20 to 30 wt. % BWOV water. The ash solution may contain 30 wt. % BWOV aqueous solution.

Along with the aqueous solution and Saudi Arabian volcanic ash, the ash solution may further include sodium silicate ($Na_2SiO_3$). The ash solution may include from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % $Na_2SiO_3$ BWOV. The $Na_2SiO_3$ may have a ratio of $Na_2O$ to $SiO_2$ of from 0.250:1 to 0.350:1, from 0.250:1 to 0.330:1, from 0.250:1 to 0.300:1, from 0.250:1 to 0.270:1, from 0.270:1 to 0.350:1, from 0.270:1 to 0.330:1, from 0.270:1 to 0.300:1, from 0.300:1 to 0.350:1, from 0.300:1 to 0.330:1, or from 0.330:1 to 0.350:1.

Along with the aqueous solution and Saudi Arabian volcanic ash, the ash solution may further include sodium hydroxide (NaOH). The ash solution may include from 3 to 10 wt. %, from 3 to 8 wt. %, from 3 to 6 wt. %, from 3 to 4 wt. %, from 4 to 10 wt. %, from 4 to 8 wt. %, from 4 to 6 wt. %, from 6 to 10 wt. %, from 6 to 8 wt. %, or from 8 to 10 wt. % NaOH BWOV.

The ash solution may have a pH of greater than 7. In embodiments, the geopolymer barrier may have a pH of from 8 to 14, from 9 to 13, from 10 to 13, from 11 to 13, from 11.5 to 13.0, from 11.5 to 12.5, or from 11.5 to 12.0.

As stated previously, the method includes allowing the Saudi Arabian volcanic ash (or the ash solution as defined in this disclosure) to contact the activation solution in the wellbore, thereby converting the activation solution into the geopolymer barrier. In embodiments, the geopolymer barrier may include from 30 to 70 wt. %, from 30 to 65 wt. %, from 30 to 60 wt. %, from 30 to 55 wt. %, from 30 to 50 wt. %, from 30 to 45 wt. %, from 30 to 40 wt. %, from 30 to 35 wt. %, from 35 to 70 wt. %, from 35 to 65 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 65 wt. %, from 40 to 60 wt. %, from 40 to 55 wt. %, from 40 to 50 wt. %, from 40 to 45 wt. %, from 45 to 70 wt. %, from 45 to 65 wt. %, from 45 to 60 wt. %, from 45 to 55 wt. %, from 45 to 50 wt. %, from 50 to 70 wt. %, from 50 to 65 wt. %, from 50 to 60 wt. %, from 50 to 55 wt. %, from 55 to 70 wt. %, from 55 to 65 wt. %, from 55 to 60 wt. %, from 60 to 70 wt. %, from 60 to 65 wt. %, or from 65 to 70 wt. % Saudi Arabian volcanic ash by weight of the geopolymer barrier.

The geopolymer barrier may have a pH of greater than 7. In embodiments, the geopolymer barrier may have a pH of from 8 to 14, from 8 to 13, from 8 to 12, from 8 to 11, from 8 to 10, from 8 to 9, from 9 to 14, from 9 to 13, from 9 to 12, from 9 to 11, from 9 to 10, from 10 to 14, from 10 to 13, from 10 to 12, from 10 to 11, from 11 to 14, from 11 to 13, from 11 to 12, from 12 to 14, from 12 to 13, from 13 to 14, from 11.5 to 13.0, from 11.5 to 12.5, or from 11.5 to 12.0.

In embodiments, the geopolymer barrier may include a sodium aluminosilicate hydrate. This sodium aluminosilicate hydrate may be a reaction product of the Saudi Arabian volcanic ash, $Na_2SiO_3$, and NaOH. Specifically, a polycondensation of silicate and aluminate monomers (from the Saudi Arabian volcanic ash) under alkaline conditions (due to the addition of NaOH and $Na_2SiO_3$) may occur, forming the sodium aluminosilicate hydrate. In preparing the geopolymer barrier, it was expected to be desirable to have approximately a 1.0:1.0 molar ratio of $Na_2O$ combined with NaOH to aluminate ($Al_2O_3$). It was contemplated that this may balance the negative charge on the Al atom with the sodium ions in the sodium aluminosilicate hydrate structure. However, after preparing a geopolymer barrier with a molar ratio of $Na_2O$ and NaOH to $Al_2O_3$ of 0.97:1.0, the resulting geopolymer barrier had an undesirably quick gelation time that would make sealing a severe loss zone difficult. To address this unexpected outcome, the ratio of $Na_2O$ and NaOH combined to $Al_2O_3$ in the geopolymer barrier of the present disclosure may range from 0.30:1.00 to 0.90:1.00, from 0.30:1.00 to 0.80:1.00, from 0.30:1.00 to 0.75:1.00, from 0.30:1.00 to 0.70:1.00, from 0.30:1.00 to 0.65:1.00, from 0.30:1.00 to 0.60:1.00, from 0.30:1.00 to 0.55:1.00, from 0.30:1.00 to 0.50:1.00, from 0.30:1.00 to 0.40:1.00, from 0.40:1.00 to 0.90:1.00, from 0.40:1.00 to 0.80:1.00, from 0.40:1.00 to 0.75:1.00, from 0.40:1.00 to 0.70:1.00, from 0.40:1.00 to 0.65:1.00, from 0.40:1.00 to 0.60:1.00, from 0.40:1.00 to 0.55:1.00, from 0.40:1.00 to 0.50:1.00, from 0.50:1.00 to 0.90:1.00, from 0.50:1.00 to 0.80:1.00, from 0.50:1.00 to 0.75:1.00, from 0.50:1.00 to 0.70:1.00, from 0.50:1.00 to 0.65:1.00, from 0.50:1.00 to 0.60:1.00, from 0.50:1.00 to 0.55:1.00, from 0.55:1.00 to 0.90:1.00, from 0.55:1.00 to 0.80:1.00, from 0.55:1.00 to 0.75:1.00, from 0.55:1.00 to 0.70:1.00, from 0.55:1.00 to 0.65:1.00, from 0.55:1.00 to 0.60:1.00, from 0.60:1.00 to 0.90:1.00, from 0.60:1.00 to 0.80:1.00, from 0.60:1.00 to 0.75:1.00, from 0.60:1.00 to 0.70:1.00, from 0.60:1.00 to 0.65:1.00, from 0.65:1.00 to 0.90:1.00, from 0.65:1.00 to 0.80:1.00, from 0.65:1.00 to 0.75:1.00, from 0.65:1.00 to 0.70:1.00, from 0.70:1.00 to 0.90:1.00, from 0.70:1.00 to 0.80:1.00, from 0.70:1.00 to 0.75:1.00, from 0.75:1.00 to 0.90:1.00, from 0.75:1.00 to 0.80:1.00, or from 0.80:1.00 to 0.90:1.00.

In embodiments, the ratio of $Na_2SiO_3$ combined with NaOH to $Al_2O_3$ may range from 0.5:1.0 to 9.0:1.0, from 0.5:1.0 to 7.0:1.0, from 0.5:1.0 to 5.0:1.0, from 0.5:1.0 to 3.0:1.0, from 0.5:1.0 to 2.0:1.0, from 0.5:1.0 to 1.5:1.0, from 0.5:1.0 to 1.0:1.0, from 1.0:1.0 to 9.0:1.0, from 1.0:1.0 to 7.0:1.0, from 1.0:1.0 to 5.0:1.0, from 1.0:1.0 to 3.0:1.0, from 1.0:1.0 to 2.0:1.0, from 1.0:1.0 to 1.5:1.0, from 1.5:1.0 to 9.0:1.0, from 1.5:1.0 to 7.0:1.0, from 1.5:1.0 to 5.0:1.0, from 1.5:1.0 to 3.0:1.0, from 1.5:1.0 to 2.0:1.0, from 2.0:1.0 to 9.0:1.0, from 2.0:1.0 to 7.0:1.0, from 2.0:1.0 to 5.0:1.0, from 2.0:1.0 to 3.0:1.0, from 3.0:1.0 to 9.0:1.0, from 3.0:1.0 to 7.0:1.0, from 3.0:1.0 to 5.0:1.0, from 5.0:1.0 to 9.0:1.0, from 5.0:1.0 to 7.0:1.0, or from 7.0:1.0 to 9.0:1.0.

The sodium aluminosilicate hydrate may have a formula of $Na_n[(—SiO_2)_z—AlO_2]_n \cdot y\ H_2O$, where n represents a degree of polymerization ranging from 1 to 50, from 1 to 40, from 1 to 30, from 1 to 25, from 1 to 20, from 1 to 15, from 1 to 10, from 1 to 5, from 5 to 50, from 5 to 40, from 5 to 30, from 5 to 25, from 5 to 20, from 5 to 15, from 5 to 10, from 10 to 50, from 10 to 40, from 10 to 30, from 10 to 25, from 10 to 20, from 10 to 15, from 15 to 50, from 15 to 40, from 15 to 30, from 15 to 25, from 15 to 20, from 20 to 50, from 20 to 40, from 20 to 30, from 20 to 25, from 25 to 50, from 25 to 40, from 25 to 30, from 30 to 50, from 30 to 40, or from 40 to 50, and z represents an amount of silicate ranging from 2 to 10, from 2 to 8, from 2 to 6, from 2 to 5, from 2 to 4, from 4 to 10, from 4 to 8, from 4 to 6, from 4 to 5, from 5 to 10, from 5 to 8, from 5 to 6, from 6 to 10, from 6 to 8, or from 8 to 10. The sodium aluminosilicate hydrate may have a structure as shown in Structure 1:

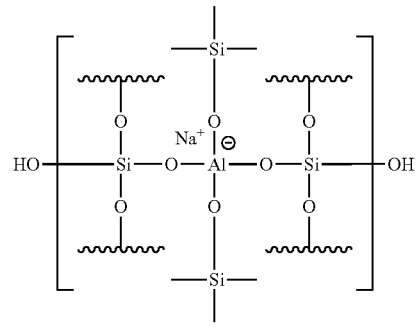

Structure 1

The sodium aluminosilicate hydrate may have a compressive strength of from 500 to 5000 psi, from 500 to 3000 psi, from 500 to 2600 psi, from 500 to 2200 psi, from 500 to 2000 psi, from 500 to 1500 psi, from 500 to 1000 psi, from 1000 to 5000 psi, from 1000 to 3000 psi, from 1000 to 2600 psi, from 1000 to 2200 psi, from 1000 to 2000 psi, from 1000 to 1500 psi, from 1500 to 5000 psi, from 1500 to 3000 psi, from 1500 to 2600 psi, from 1500 to 2200 psi, from 1500 to 2000 psi, from 2000 to 5000 psi, from 2000 to 3000 psi, from 2000 to 2600 psi, from 2000 to 2200 psi, from 2200 to 5000 psi, from 2200 to 3000 psi, from 2200 to 2600 psi, from 2600 to 5000 psi, from 2600 to 3000 psi, or from 3000 to 5000 psi.

In some embodiments the geopolymer barrier may contain a cement precursor material. The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under temperatures greater than 1000° C. that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the geopolymer barrier of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition. In other embodiments, the cement precursor material may be Saudi cement precursor, a combination of Portland cement precursor and crystalline silica, also known as quartz.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, other similar compounds, and combinations of these. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The geopolymer barrier may include Saudi Class G cement. Saudi Class G cement may include from 60 to 100 wt. %, from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz. Saudi Class G cement may have a pH of greater than 7, of from 8 to 14, of from 10 to 13, of from 11 to 13, of from 12 to 13, or of 12.4. Saudi Class G cement may have a bulk density at 20° C. of from 70 to 120 lb/ft$^3$, of from 80 to 110 lb/ft$^3$, of from 90 to 100 lb/ft$^3$, or of 94 lb/ft$^3$. Saudi Class G cement may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

In some embodiments, the geopolymer barrier may contain at least one additive other than Saudi Arabian volcanic ash. As non-limiting examples, suitable additives may include accelerators, retarders, extenders, weighting agents, fluid loss control agents, lost circulation control agents, surfactants, antifoaming agents, specialty additives such as elastomers or fibers, and combinations of these.

In some embodiments, the geopolymer barrier may contain from 0.1 to 10 wt. % BWOV of the one or more additives based on the total weight of the geopolymer barrier. For instance, the geopolymer barrier may contain from 0.1 to 8 wt. % BWOV of the one or more additives, from 0.1 to 5 wt. % BWOV of the one or more additives, or from 0.1 to 3 wt. % BWOV of the one or more additives. The geopolymer barrier may contain from 1 to 10 wt. % BWOV of the one or more additives, from 1 to 8 wt. % BWOV, from 1 to 5 wt. % BWOV, or from 1 to 3 wt. % BWOV of the one or more additives. In some embodiments, the geopolymer barrier may contain from 3 to 5 wt. % BWOV, from 3 to 8 wt. % BWOV, from 3 to 10 wt. % BWOV, or from 5 to 10 wt. % BWOV of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. Without being bound by any particular theory, in some embodiments, the anionic groups on the dispersant may be adsorbed on the surface of the cement particles to impart a negative charge to the geopolymer barrier. The electrostatic repulsion of the negatively charged cement particles may allow the geopolymer barrier to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the geopolymer barrier and may, in some embodiments, cause additional retardation effects.

In some embodiments, the geopolymer barrier may contain from 0.1 to 10 wt. % BWOV of one or more fluid loss additives, the one or more dispersants, or both. The geopolymer barrier may contain from 0.02 to 90 pound per barrel (lb/bbl) of the fluid loss additives, the one or more dispersants, or both based on the total weight of the geopolymer barrier. For instance, the geopolymer barrier may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

The method may further include resuming hydrocarbon production from the reservoir after forming the geopolymer barrier. The method may include reducing water cut by sealing the water-bearing subsurface formation with the geopolymer barrier. In such embodiments, the hydrocarbon production after forming the geopolymer barrier may have a second water cut, and the second water cut may be less than the first water cut in the hydrocarbon production from before forming the geopolymer barrier. The second water cut may be from 0% to 40%, from 0% to 30%, from 0% to 20%, from 0% to 10%, from 0% to 5%, from 5% to 40%, from 5% to 30%, from 5% to 20%, from 5% to 10%, from 10% to 40%, from 10% to 30%, from 10% to 20%, from 20% to 40%, from 20% to 30%, or from 30% to 40%.

As previously stated, the geopolymer barrier may be acid soluble, due to the presence of one or both of $CaCO_3$ or $Mn_3O_4$. The method may further include acidizing the geopolymer barrier after the geopolymer barrier forms between the wellbore and the subsurface formation. Acidizing the geopolymer barrier may include introducing an acid solution into the wellbore and allowing the acid solution to contact the geopolymer barrier, thereby acidizing and dissolving the geopolymer barrier.

In embodiments, from 50 to 99.9 wt. % of the geopolymer barrier may dissolve after allowing the acid solution to contact the geopolymer barrier. In embodiments, from 50 to 99.9 wt. %, from 50 to 99 wt. %, from 50 to 98 wt. %, from 50 to 97 wt. %, from 50 to 95 wt. %, from 50 to 93 wt. %, from 50 to 92 wt. %, from 50 to 91 wt. %, from 50 to 90 wt. %, from 50 to 89 wt. %, from 50 to 85 wt. %, from 50 to 80 wt. %, from 50 to 75 wt. %, from 75 to 99.9 wt. %, from 75 to 99 wt. %, from 75 to 98 wt. %, from 75 to 97 wt. %, from 75 to 95 wt. %, from 75 to 93 wt. %, from 75 to 92 wt. %, from 75 to 91 wt. %, from 75 to 90 wt. %, from 75 to 89 wt. %, from 75 to 85 wt. %, from 75 to 80 wt. %, from 80 to 99.9 wt. %, from 80 to 99 wt. %, from 80 to 98 wt. %, from 80 to 97 wt. %, from 80 to 95 wt. %, from 80 to 93 wt. %, from 80 to 92 wt. %, from 80 to 91 wt. %, from 80 to 90 wt. %, from 80 to 89 wt. %, from 80 to 85 wt. %, from 85 to 99.9 wt. %, from 85 to 99 wt. %, from 85 to 98 wt. %, from 85 to 97 wt. %, from 85 to 95 wt. %, from 85 to 93 wt. %, from 85 to 92 wt. %, from 85 to 91 wt. %, from 85 to 90 wt. %, from 85 to 89 wt. %, from 89 to 99.9 wt. %, from 89 to 99 wt. %, from 89 to 98 wt. %, from 89 to 97 wt. %, from 89 to 95 wt. %, from 89 to 93 wt. %, from 89 to 92 wt. %, from 89 to 91 wt. %, from 89 to 90 wt. %, from 90 to 99.9 wt. %, from 90 to 99 wt. %, from 90 to 98 wt. %, from 90 to 97 wt. %, from 90 to 95 wt. %, from 90 to 93 wt. %, from 90 to 92 wt. %, from 90 to 91 wt. %, from 91 to 99.9 wt. %, from 91 to 99 wt. %, from 91 to 98 wt. %, from 91 to 97 wt. %, from 91 to 95 wt. %, from 91 to 93 wt. %, from 91 to 92 wt. %, from 92 to 99.9 wt. %, from 92 to 99 wt. %, from 92 to 98 wt. %, from 92 to 97 wt. %, from 92 to 95 wt. %, from 92 to 93 wt. %, from 93 to 99.9 wt. %, from 93 to 99 wt. %, from 93 to 98 wt. %, from 93 to 97 wt. %, from 93 to 95 wt. %, from 95 to 99.9 wt. %, from 95 to 99 wt. %, from 95 to 98 wt. %, from 95 to 97 wt. %, from 97 to 99.9 wt. %, from 97 to 99 wt. %, from 97 to 98 wt. %, from 98 to 99.9 wt. %, from 98 to 99 wt. %, or from 99 to 99.9 wt. % of the geopolymer barrier may dissolve after allowing the acid solution to contact the geopolymer barrier.

The geopolymer barrier may have a thickening time at 100° F. of greater than 1, 2, 5, 10, or 12 hours. A thickening time test is used to simulate pumping conditions in order to determine a length of time before the cement becomes difficult or impossible to pump. The most common method to determine thickening time is via a pressurized consistometer. This device allows pressure and temperature to be applied to a geopolymer barrier while it is being stirred (typically at 150 rpm). A resistor arm on a potentiometer indicates resistance to the paddle turning as the cement sets. The apparatus is calibrated to a standard output in Bearden Consistency units. The device is fully automated and can simulate squeeze schedules and/or batch mixing, etc.

The geopolymer barrier may have a density of from 100 to 140 lb/ft³. In other embodiments, the geopolymer barrier may have a density of from 100 to 130 lb/ft³, from 100 to 120 lb/ft³, from 100 to 115 lb/ft³, from 100 to 110 lb/ft³, from 100 to 105 lb/ft³, from 105 to 140 lb/ft³, from 105 to 130 lb/ft³, from 105 to 120 lb/ft³, from 105 to 115 lb/ft³, from 105 to 110 lb/ft³, from 110 to 140 lb/ft³, from 110 to 130 lb/ft³, from 110 to 120 lb/ft³, from 110 to 115 lb/ft³, from 115 to 140 lb/ft³, from 115 to 130 lb/ft³, from 115 to 120 lb/ft³, from 120 to 140 lb/ft³, from 120 to 130 lb/ft³, or from 130 to 140 lb/ft³. The geopolymer barrier may have a density of greater than 100 lb/ft³, greater than 105 lb/ft³, greater than 110 lb/ft³, greater than 114 lb/ft³, greater than 115 lb/ft³, greater than 120 lb/ft³, greater than 125 lb/ft³, or greater than 127 lb/ft³, while being less than 140 lb/ft³, less than 135 lb/ft³, less than 130 lb/ft³, less than 129 lb/ft³, less than 125 lb/ft³, less than 120 lb/ft³, less than 116 lb/ft³, less than 115 lb/ft³, less than 110 lb/ft³, less than 108 lb/ft³, or less than 105 lb/ft³.

The viscosity of the geopolymer barrier compositions may be measured using a standard oilfield viscometer, such as a FANN® Model 35 viscometer manufactured by Fann Instrument Company for example, according to test methods provided in the API Recommended Practice For Field Testing Water-Based Cement (RP 13B-1/ISO 10414-1:2002). The viscometer reports shear stress readings at various shear rates. The shear stress readings are reported in units of pounds of force per 100 square feet (lbf/100 ft²). The shear rate is measured in rpm. The viscometer may report shear stress readings at shear rates of at least one of 600 rpm, 300 rpm, 200 rpm, 100 rpm, 6 rpm, or 3 rpm. These shear stress readings may be used to determine the viscosity of the geopolymer barrier at any of the shear rates, using Equation 4, assuming a viscometer with an R1 rotor sleeve, B1 bob, and F1 torsion spring:

$$\mu = \frac{300}{N}\theta_N \qquad \text{Equation 4}$$

Where
$\mu$=viscosity, (cp)
N=viscometer speed, shear rate (rpm)
$\theta_N$=viscometer reading, shear stress (lbf/100 ft²)

The rheology of geopolymer barrier compositions may be modeled based on Bingham plastic flow behavior. In particular, the geopolymer barrier composition having Saudi Arabian volcanic ash behaves as a rigid body at lesser shear stress but flows as a viscous fluid at greater shear stress. The rheological behavior of the geopolymer barrier composition may be determined by measuring the shear stress on the geopolymer barrier composition at different shear rates, which may be accomplished by measuring the shear stress and/or shear rate on the geopolymer barrier composition using a FANN® Model 35 viscometer operated at 3 rpm, 6 rpm, 100 rpm, 200 rpm, 300 rpm, or 600 rpm, for example. A Bingham plastic fluid may be modeled by Equation 5.

$$\tau=(PV)\dot{\gamma}+4.79YP \qquad \text{Equation 5}$$

Where
$\tau$=shear stress, (dynes per square centimeter (dyne/cm²))
PV=plastic viscosity, (cP)
YP=shear rate, (s⁻¹)
YP=yield point, (lbf/100 ft²)

The rheology of the geopolymer barrier composition may be evaluated from the plastic viscosity (PV) and the yield point (YP), which are parameters from the Bingham plastic rheology model. The PV is related to the resistance of the geopolymer barrier composition to flow due to mechanical interaction between the solids of the geopolymer barrier composition and represents the viscosity of the geopolymer barrier composition extrapolated to infinite shear rate. In other words, the PV is the slope of the shear stress versus shear rate curve of the Bingham plastic model. The PV reflects the type and concentration of the solids in the geopolymer barrier composition, and a lesser PV is preferred. The PV of the geopolymer barrier composition may be estimated by measuring the shear stress of the geopolymer barrier using a FANN® Model 35 viscometer at shear rates of 300 rpm and 600 rpm and subtracting the 300 rpm shear stress measurement from the 600 rpm shear stress measurement according to Equation 6.

$$PV = \theta_{600} - \theta_{300} \qquad \text{Equation 6}$$

Where

PV=plastic viscosity, (cP)

$\theta_{600}$=shear stress viscometer reading at 600 rpm, (lbf/100 ft$^2$)

$\theta_{300}$=shear stress viscometer reading at 300 rpm, (lbf/100 ft$^2$)

When the shear stress measurement at 600 rpm is not available, the plastic viscosity may be calculated by determining the difference between any two shear stress measurements, dividing the difference by the difference of the shear rates that the two shear stresses were measured at, and multiplying that factor by 300. This formula is provided in Equation 7.

$$PV = \frac{300}{N_2 - N_1}(\theta_{N_2} - \theta_{N_1}) \qquad \text{Equation 7}$$

Where

PV=plastic viscosity, (cP)

N=viscometer speed, shear rate (rpm)

$\theta_N$=shear stress viscometer reading at N rpm, (lbf/100 ft$^2$)

The YP represents the shear stress less than which the geopolymer barrier composition behaves as a rigid body and greater than which the geopolymer barrier composition flows as a viscous fluid. In other words, the YP represents the amount of stress required to move the geopolymer barrier composition from a static condition. The yield point is the resistance of initial flow of a fluid, or the stress required in order to move the fluid. It can be simply stated that the yield point is the attractive force among colloidal particles in geopolymer barrier. The YP of a geopolymer barrier composition is correlated with the capacity of the geopolymer barrier composition to carry rock cuttings through the annulus, which in simplified terms indicates the geopolymer barrier composition's hole-cleaning ability. Yield point affects both the start-up pressure after a temporary shut-down and the void filling properties of cements during cementing operations. YP of equal to or greater than 15 lbf/100 ft$^2$ is considered acceptable for drilling. The YP is determined by extrapolating the Bingham plastic rheology model to a shear rate of zero. In other words, the PV is the y-intercept of the shear stress v. shear rate curve of the Bingham plastic model. The YP of the geopolymer barrier composition may be estimated from the PV from Equation 7 by subtracting the PV from Equation 7 from the shear stress of the geopolymer barrier measured at 300 rpm according to Equation 8.

$$YP = \theta_{300} - PV \qquad \text{Equation 8}$$

The YP is expressed as a force per area, such as in field units of lbf/100 ft$^2$, for example. The YP may be converted to SI units of dyne/cm$^2$, as 1 lbf/100 ft$^2$=4.79 dyne/cm$^2$.

The geopolymer barrier may have a plastic viscosity of from 50 to 350 cP. In other embodiments, the geopolymer barrier may have a plastic viscosity of from 50 to 350 cP, from 50 to 300 cP, from 50 to 200 cP, from 50 to 150 cP, from 50 to 125 cP, from 50 to 100 cP, from 50 to 80 cP, from 50 to 60 cP, from 60 to 350 cP, from 60 to 300 cP, from 60 to 200 cP, from 60 to 150 cP, from 60 to 125 cP, from 60 to 100 cP, from 60 to 80 cP, from 80 to 350 cP, from 80 to 300 cP, from 80 to 200 cP, from 80 to 150 cP, from 80 to 125 cP, from 80 to 100 cP, from 100 to 350 cP, from 100 to 300 cP, from 100 to 200 cP, from 100 to 150 cP, from 100 to 125 cP, from 100 to 100 cP, from 100 to 80 cP, from 125 to 350 cP, from 125 to 300 cP, from 125 to 200 cP, from 125 to 150 cP, from 150 to 350 cP, from 150 to 300 cP, from 150 to 200 cP, from 200 to 300 cP, from 200 to 350 cP, or from 300 to 350 cP.

The geopolymer barrier of the present disclosure may have a yield point of from 5 to 70 lbf/100 ft$^2$, from 5 to 60 lbf/100 ft$^2$, from 5 to 55 lbf/100 ft$^2$, from 5 to 40 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 70 lbf/100 ft$^2$, from 10 to 60 lbf/100 ft$^2$, from 10 to 55 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 70 lbf/100 ft$^2$, from 15 to 60 lbf/100 ft$^2$, from 15 to 55 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 70 lbf/100 ft$^2$, from 20 to 60 lbf/100 ft$^2$, from 20 to 55 lbf/100 ft$^2$, from 20 to 40 lbf/100 ft$^2$, from 20 to 30 lbf/100 ft$^2$, from 20 to 25 lbf/100 ft$^2$, from 25 to 70 lbf/100 ft$^2$, from 25 to 60 lbf/100 ft$^2$, from 25 to 55 lbf/100 ft$^2$, from 25 to 40 lbf/100 ft$^2$, from 25 to 30 lbf/100 ft$^2$, from 30 to 70 lbf/100 ft$^2$, from 30 to 60 lbf/100 ft$^2$, from 30 to 55 lbf/100 ft$^2$, from 30 to 40 lbf/100 ft$^2$, from 40 to 70 lbf/100 ft$^2$, from 40 to 60 lbf/100 ft$^2$, from 40 to 55 lbf/100 ft$^2$, from 55 to 70 lbf/100 ft$^2$, from 55 to 60 lbf/100 ft$^2$, or from 60 to 70 lbf/100 ft$^2$.

The gel strength of a geopolymer barrier refers to the shear stress of the geopolymer barrier composition measured at a low shear rate (such as 3 rpm or 6 rpm) following a defined period of time during which the geopolymer barrier composition is maintained in a static state. The shear stress of the geopolymer barrier composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Cement (RP 13B-1/ISO 10414-1:2002) published August 2014 and incorporated by reference into this disclosure in its entirety. To measure the gel strength, the geopolymer barrier composition is first stirred by contacting the geopolymer barrier composition with the spindle of the viscometer and operating the viscometer at 600 rotations per minute (rpm). The viscometer is then turned off fora period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the geopolymer barrier composition comes to rest in a static state. Upon expiration of the time period, the viscometer is turned back on at a low speed, such as 3 rpm for example, to generate a low shear rate. The viscometer reading is then taken. The gel strength of the geopolymer barrier composition is reported in units of lbf/100 ft$^2$.

The geopolymer barrier described in this disclosure may have a 10-second gel strength of from 5 to 50 lbf/100 ft$^2$, from 5 to 40 lbf/100 ft$^2$, from 5 to 35 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 50 lbf/100 ft$^2$, from 10 to 40 lbf/100 ft$^2$, from 10 to 35 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 50 lbf/100 ft$^2$, from 15 to 40 lbf/100 ft$^2$, from 15 to 35 lbf/100 ft$^2$, from 15 to 30 lbf/100 ft$^2$, from 15 to 25 lbf/100 ft$^2$, from 15 to 20 lbf/100 ft$^2$, from 20 to 50 lbf/100 ft$^2$, from 20 to 40 lbf/100 ft$^2$, from 20 to 35 lbf/100 ft$^2$, from 20 to 30 lbf/100 ft$^2$, from 20 to 25 lbf/100 ft$^2$, from 25 to 50 lbf/100 ft$^2$, from 25 to 40 lbf/100 ft$^2$, from 25 to 35 lbf/100 ft$^2$, from 25 to 30 lbf/100 ft$^2$, from 30 to 50 lbf/100 ft$^2$, from 30 to 40 lbf/100 ft$^2$, from 30 to 35 lbf/100 ft$^2$, from 35 to 50 lbf/100 ft$^2$, from 35 to 40 lbf/100 ft$^2$, or from 40 to 50 lbf/100 ft$^2$. The 10-second gel strength of the geopolymer barrier composition having Saudi Arabian volcanic ash may be compared to a 10-second gel strength of a comparative geopolymer barrier without Saudi Arabian volcanic ash. The 10-second gel strength of the geopolymer barrier composition having Saudi Arabian volcanic ash may be less than or equal to 90% of the 10-second gel strength of the comparative geopolymer barrier, or less than or equal to 80% of the 10-second gel strength of the comparative geopolymer barrier, or less than or equal to 70% of the 10-second gel strength of the comparative geopolymer barrier.

The geopolymer barrier may have a 10 minute gel strength of from 10 to 60 lbf/100 ft$^2$, from 10 to 50 lbf/100 ft$^2$, from 10 to 45 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 60 lbf/100 ft$^2$, from 15 to 50 lbf/100 ft$^2$, from 15 to 45 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 60 lbf/100 ft$^2$, from 20 to 50 lbf/100 ft$^2$, from 20 to 45 lbf/100 ft$^2$, from 20 to 40 lbf/100 ft$^2$, from 20 to 30 lbf/100 ft$^2$, from 20 to 25 lbf/100 ft$^2$, from 25 to 60 lbf/100 ft$^2$, from 25 to 50 lbf/100 ft$^2$, from 25 to 45 lbf/100 ft$^2$, from 25 to 40 lbf/100 ft$^2$, from 25 to 30 lbf/100 ft$^2$, from 30 to 60 lbf/100 ft$^2$, from 30 to 50 lbf/100 ft$^2$, from 30 to 45 lbf/100 ft$^2$, from 30 to 40 lbf/100 ft$^2$, from 35 to 60 lbf/100 ft$^2$, from 35 to 50 lbf/100 ft$^2$, from 35 to 45 lbf/100 ft$^2$, from 40 to 60 lbf/100 ft$^2$, from 40 to 50 lbf/100 ft$^2$, from 40 to 45 lbf/100 ft$^2$, from 45 to 60 lbf/100 ft$^2$, from 45 to 50 lbf/100 ft$^2$, or from 50 to 60 lbf/100 ft$^2$. The 10-minute gel strength of the geopolymer barrier composition having Saudi Arabian volcanic ash may be compared to a 10-minute gel strength of a comparative geopolymer barrier without Saudi Arabian volcanic ash. The 10-minute gel strength of the geopolymer barrier composition having Saudi Arabian volcanic ash may be less than or equal to 90% of the 10-minute gel strength of the comparative geopolymer barrier, or less than or equal to 80% of the 10-minute gel strength of the comparative geopolymer barrier, or less than or equal to 70% of the 10-minute gel strength of the comparative geopolymer barrier.

EXAMPLES

Example 1

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochromater (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The composition is shown in Table 1 to be presented.

TABLE 1

| Composition of Saudi Arabian Volcanic Ash | |
|---|---|
| Element | Wt. % |
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

The WDXRF results show that the sample consisted of mainly O and Si with appreciable amounts of Al, Fe, Ca, Mg, and Na.

Example 2

X-ray powder diffraction (XRD) is a rapid analytical technique primarily used for phase identification of a crystalline material and can provide information on unit cell dimensions. The analyzed material is finely ground, homogenized, and average bulk composition is determined. X-ray diffractometers consist of three basic elements: an X-ray tube, a sample holder, and an X-ray detector. X-rays are generated in a cathode ray tube by heating a filament to produce electrons, accelerating the electrons toward a target by applying a voltage, and bombarding the target material with electrons. When electrons have sufficient energy to dislodge inner shell electrons of the target material, characteristic X-ray spectra are produced. These spectra consist of several components, the most common being $K_\alpha$ and $K_\beta$. $K_\alpha$ consists, in part, of $K_{\alpha 1}$ and $K_{\alpha 2}$. $K_{\alpha 1}$ has a slightly shorter wavelength and twice the intensity as $K_{\alpha 2}$. The specific wavelengths are characteristic of the target material (Cu, Fe, Mo, Cr). Filtering, by foils or crystal monochrometers, is required to produce the monochromatic X-rays needed for diffraction. $K_{\alpha 1}$ and $K_{\alpha 2}$ are sufficiently close in wavelength such that a weighted average of the two is used. These X-rays are collimated and directed onto the sample. As the sample and detector are rotated, the intensity of the reflected X-rays is recorded. A detector records and processes this X-ray signal and converts the signal to a count rate which is then output to a device such as a printer or computer monitor.

For the XRD analysis, a sample of Saudi Arabian volcanic ash was homogenized and manually grounded by an agate mortar and a pestle for several minutes to achieve fine particle size. Then, 4 grams of the fine Saudi Arabian volcanic ash powder was mounted into the XRD sample holder by back pressing. XRD was then performed on the sample using the SALAM 014 method. The composition is shown in Table 2 to be presented.

TABLE 2

XRD Composition of Saudi Arabian Volcanic Ash

| Compound | Wt. % |
|---|---|
| Amorphous Material | 70 |
| Labradorite: $Ca_{0.65}Na_{0.32}(Al_{1.62}Si_{2.38}O_8)$ | 19 |
| Augite: $Ca(Fe,Mg)Si_2O_6$ | 6 |
| Forsterite: $Mg_2SiO_4$ | 5 |

The XRD results show that the sample consisted mainly of amorphous material with appreciable amounts of labradorite, augite, and forsterite. The WDXRF results confirmed the XRD findings.

Example 3

Geopolymer barriers were formed in accordance with the previous description. The compositions are described in the tables to be presented.

TABLE 3

Compositions of Examples A, B, and C

| | Water (mL) | A-3L ($Na_2SiO_3$) (mL) | NaOH (6 Mol solution) (mL) | Saudi Arabian Volcanic Ash (g) | Micromax ($Mn_3O_4$) (g) | $CaCO_3$ (g) |
|---|---|---|---|---|---|---|
| Example A | 110 | 7 | 4 | 40 | 200 | — |
| Example B | 180 | 26.2 | 4 | 40 | 200 | — |
| Example C | 81 | 7 | 4 | 40 | — | 200 |

A-3L is commercially available from BJ Service Company Limited (headquartered in Houston, Tex.), and includes from 30% to 40% $Na_2SiO_3$. Micromax is commercially available from Halliburton (headquartered in Houston, Tex.), and includes hausmannite ore ($Mn_3O_4$) ground to an average particle size of 5 microns.

The physical properties of each example were then measured and are provided in the tables to be presented.

TABLE 4

Viscometer Data for Examples A, B, and C

| | RPM | | | | | |
|---|---|---|---|---|---|---|
| | 600 | 300 | 200 | 100 | 6 | 3 |
| Example A | 31 | 24 | 21 | 18 | 17 | 16 |
| Example B | 35 | 25 | 21 | 18 | 17 | 16 |
| Example C | 200 | 105 | 68 | 35 | 3 | 1 |

TABLE 5

Rheology Data for Examples A, B, and C

| | Density (pcf) | PV | YP | 10 second gel strength | 10 minute gel strength |
|---|---|---|---|---|---|
| Example A | 128 | 7 cP | 17 lbf/100 ft² | 65 lbf/100 ft² | 60 lbf/100 ft² |
| Example B | 107.2 | 10 cP | 15 lbf/100 ft² | 15 lbf/100 ft² | 20 lbf/100 ft² |
| Example C | 115.52 | 95 cP | 10 lbf/100 ft² | 5 lbf/100 ft² | 45 lbf/100 ft² |

Example A had a density of 128 pounds per cubic feet (pcf). Example B had a density of 107.02 pcf. Example C had a density of 115.52 pcf. It may be desirable to increase the density of the geopolymer barrier to increase the hydrostatic pressure exerted by the geopolymer barrier onto the water producing formation. Additionally, increasing the density may also increase the penetration of the geopolymer barrier into the water producing formation.

Example A had a yield point of 17 lbf/100 ft². Example B had a yield point of 15 lbf/100 ft². Example C had a yield point of 10 lbf/100 ft². It may be desirable to decrease the yield point of the geopolymer barrier to increase the penetration of the geopolymer barrier into the subsurface formation and to reduce water production.

The acid solubility of Examples B and C was then tested by adding a 15 vol. % acid solution to Examples B and C. The acid solution was prepared by slowly and carefully transferring 417 milliLiters (mL) commercial HCl acid to a 1 liter standard flask containing 400 mL distilled water The commercial HCl acid included 37 vol. % HCl and is available from Sigma-Aldrich. The acid solution was then mixed well.

The procedure for the acid solubility experiment is shown in Table 6 below:

TABLE 6

Acid Solubility Data for Examples B and C

| Step # | Description |
|---|---|
| 1 | Weigh 10.0 g of the Example (B or C) to the nearest 0.1 mg, record the weight and then transfer it to a dry, clean beaker. |
| 2 | Measure 150 ml of the 15 vol. % acid solution. Slowly and carefully add the 15 vol. % acid solution to the beaker containing the Example (B or C) sample. |
| 3 | Heat the sample gently for 1 hour at 150° F. and keep stirring with a glass rod. Use a thermometer to check and maintain the temperature. |
| 4 | Turn off the heat, cover the beaker with clean evaporating dish, and cool the sample to room temperature. |
| 5 | Thoroughly clean a filtering crucible with the 15 vol. % acid solution and deionized water. |
| 6 | Dry the filtering crucible in the oven at 230° F. Remove the filtering crucible from oven using tongs and cool the filtering crucible to room temperature in a desiccator for one hour. Weigh the filtering crucible to nearest 0.0001 g. |
| 7 | Place the filtering crucible on the filtering flask using flask adapter and connect to a vacuum source. |
| 8 | After the insoluble materials settle (residue) in the beaker, transfer the clear supernatant liquid into the filtering crucible by directing the stream of liquid into the filtering crucible along a glass rod without disturbing the residue. |
| 9 | Add about 20-25 mL deionized water to the beaker containing the residue and stir thoroughly. Allow the residue to settle once again and transfer the clear liquid in to the crucible as above. |
| 10 | Repeat the washing process with small quantity of deionized water till the washing does not give a precipitate with $AgNO_3$ solution (free of chlorides). |

TABLE 6-continued

Acid Solubility Data for Examples B and C

| Step # | Description |
|---|---|
| 11 | Transfer the residue completely into the filtering crucible. Remove any particles sticking to the side of the beaker with a rubber tipped glass rod. |
| 12 | Wash the residue in the crucible once again and wait until water has completely drained off. |
| 13 | Carefully remove the crucible with the residue from the filtering flask; place it in the oven vertically to avoid losing any insoluble material. Dry it at 220° F. for two hours. |
| 14 | Place the crucible in the oven and dry at 220° F. for two hours. |
| 15 | Remove the crucible from the oven; and cool it to room temperature in the desiccator for one hour. |
| 16 | Weigh the crucible with insoluble material to the nearest 0.0001 g. |

TABLE 7

Acid Solubility Data for Examples B and C

| | Initial Weight ($W_1$) (g) | Undissolved Weight (g) | Dissolved Weight (g) | Percentage Dissolved (%) |
|---|---|---|---|---|
| Example B | 8.654 | 0.779 | 7.875 | 90.9 |
| Example C | 11.919 | 1.1 | 1.0819 | 90.8 |

Examples B and C both exhibited good acid solubility, where greater than 90% of the geopolymer barrier was dissolved.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose a recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of sealing a water-bearing subsurface formation comprising:
   introducing an activation solution comprising an aqueous solution, $Na_2SiO_3$ (sodium silicate), NaOH (sodium hydroxide), and one or both of $CaCO_3$ (calcium carbonate) or $Mn_3O_4$ (manganese oxide) into a wellbore;
   introducing Saudi Arabian volcanic ash into the wellbore, in which:
      introducing Saudi Arabian volcanic ash into the wellbore comprises introducing an ash solution comprising an aqueous solution and Saudi Arabian volcanic ash;
      the aqueous solution comprises deionized water, tap water, fresh water, salt water, natural or synthetic brine, municipal water, formation water, produced water, well water, filtered water, distilled water, sea water, or combinations of these;
      the ash solution comprises from 30 to 60 wt. % Saudi Arabian volcanic ash; and the Saudi Arabian volcanic ash comprises SO$_3$, CaO, SiO$_2$, Al$_2$O$_3$, Fe$_2$O$_3$, MgO, and K$_2$O; and allowing the Saudi Arabian volcanic ash to contact the activation solution in the wellbore, thereby forming a geopolymer barrier between the wellbore and the water-bearing subsurface formation and sealing the water-bearing subsurface formation.

2. The method of claim 1, further comprising reducing water cut by sealing the water-bearing subsurface formation.

3. The method of claim 2, further comprising:
producing hydrocarbons from a reservoir, where the hydrocarbon production has a first water cut, before introducing the activation solution and the Saudi Arabian volcanic ash;
stopping hydrocarbon production from the reservoir before introducing the activation solution and the Saudi Arabian volcanic ash;
resuming hydrocarbon production from the reservoir after forming the geopolymer barrier, where the hydrocarbon production has a second water cut, and the second water cut is less than the first water cut.

4. The method of claim 1, in which the activation solution comprises from 10 to 90 wt. % CaCO$_3$ or Mn$_3$O$_4$.

5. The method of claim 1, in which the activation solution comprises from 25 to 50 wt. % Na$_2$SiO$_3$ and 15 to 35 wt. % NaOH.

6. The method of claim 1, in which the Na$_2$SiO$_3$ has a ratio of Na$_2$O to SiO$_2$ of from 0.250:1 to 0.350:1.

7. The method of claim 1, in which the activation solution comprises SiO$_2$ in an amount of from 2 to 4 times the amount of Al$_2$O$_3$ present in the Saudi Arabian volcanic ash by weight.

8. The method of claim 1, in which the activation solution comprises a pH of from 11.6 to 13.0.

9. The method of claim 1, in which the Saudi Arabian volcanic ash has a particle size of from 20 to 30 μm.

10. The method of claim 1, in which the Saudi Arabian volcanic ash is free of TiO$_2$.

11. The method of claim 1, in which the Saudi Arabian volcanic ash comprises from 40 wt. % to 50 wt. % SiO$_2$ and from 10 wt. % to 20 wt. % Al$_2$O$_3$.

12. The method of claim 1, in which the Saudi Arabian volcanic ash comprises:
from 0.05 wt. % to 0.2 wt. % SO$_3$;
from 5 wt. % to 10 wt. % CaO;
from 40 wt. % to 50 wt. % SiO$_2$;
from 10 wt. % to 20 wt. % Al$_2$O$_3$;
from 10 wt. % to 15 wt. % Fe$_2$O$_3$;
from 5 wt. % to 10 wt. % MgO; and
from 0.5 wt. % to 5 wt. % K$_2$O.

13. The method of claim 1, in which the ash solution further comprises one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, manganese tetraoxide, silica flour, and silica sand.

14. The method of claim 1, in which the geopolymer barrier has a compressive strength of from 1300 to 1500 psi.

15. The method of claim 1, in which the geopolymer barrier has a ratio of Na$_2$SiO$_3$ combined with NaOH to Al$_2$O$_3$ ranges from 0.5:1.0 to 9.0:1.0.

16. The method of claim 1, in which the geopolymer barrier comprises a sodium aluminosilicate hydrate.

17. The method of claim 16, in which the sodium aluminosilicate hydrate comprises a formula of:
Na$_n$[(—SiO$_2$)$_z$—AlO$_2$]$_n$·y H$_2$O, where n represents a degree of polymerization ranging 1 to 50 and z represents an amount of silicate ranging from 2 to 10.

18. The method of claim 16, in which the sodium aluminosilicate hydrate has a structure of:

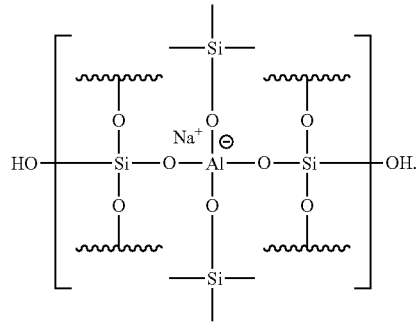

19. A method of sealing a water-bearing subsurface formation comprising:
introducing an activation solution comprising an aqueous solution, Na$_2$SiO$_3$ (sodium silicate), NaOH (sodium hydroxide), and one or both of CaCO$_3$ (calcium carbonate) or Mn$_3$O$_4$ (manganese oxide) into a wellbore;
introducing Saudi Arabian volcanic ash into the wellbore, in which:
the Saudi Arabian volcanic ash comprises:
from 0.05 wt. % to 0.2 wt. % SO$_3$;
from 5 wt. % to 10 wt. % CaO;
from 40 wt. % to 50 wt. % SiO$_2$;
from 10 wt. % to 20 wt. % Al$_2$O$_3$;
from 10 wt. % to 15 wt. % Fe$_2$O$_3$;
from 5 wt. % to 10 wt. % MgO; and
from 0.5 wt. % to 5 wt. % K$_2$O; and
the Saudi Arabian volcanic ash is free of TiO$_2$; and
allowing the Saudi Arabian volcanic ash to contact the activation solution in the wellbore, thereby forming a geopolymer barrier between the wellbore and the water-bearing subsurface formation and sealing the water-bearing subsurface formation.

* * * * *